Figure 1:
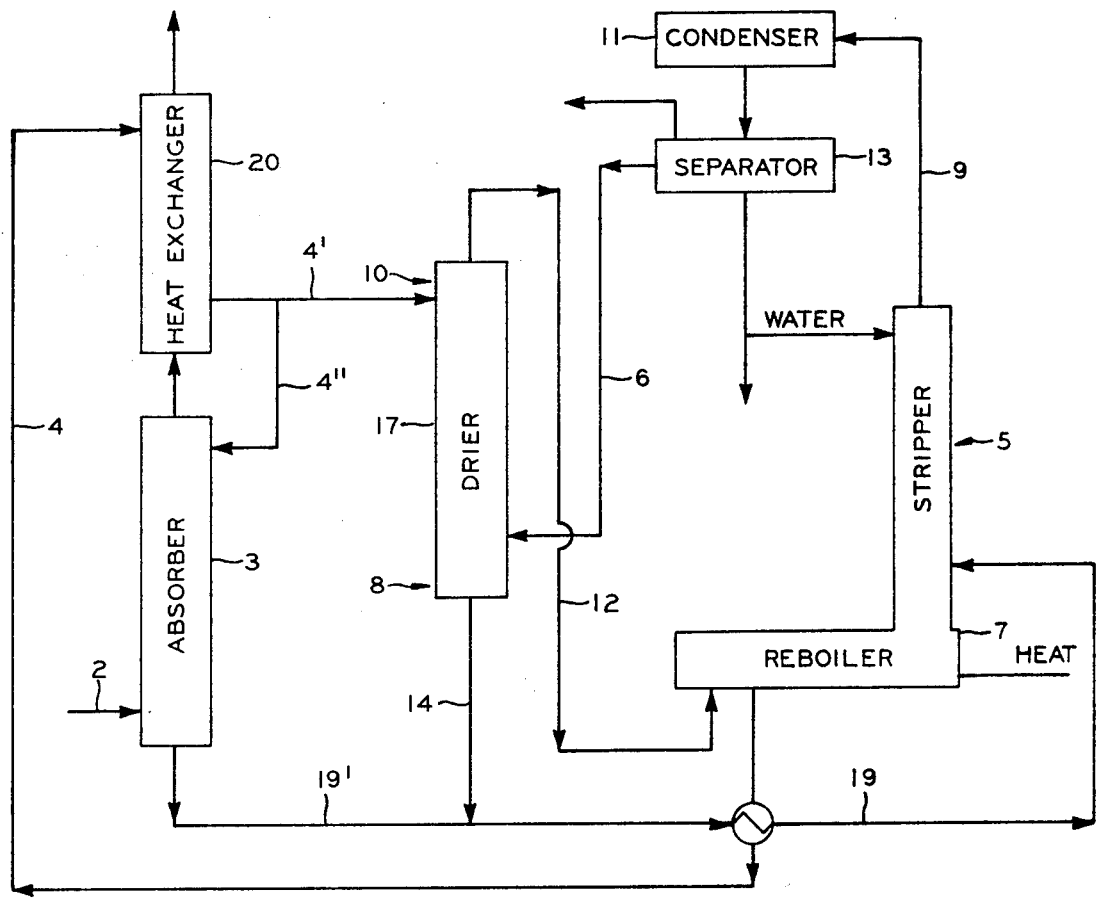

United States Patent [19]
Alleman et al.

[11] 3,736,725
[45] June 5, 1973

[54] APPARATUS AND METHOD FOR DRYING GAS BY GLYCOL SCRUBBING

[75] Inventors: Carl E. Alleman; William F. Tuckett, both of Bartlesville, Okla.

[73] Assignee: Phillips Petroleum Company, Bartlesville, Okla.

[22] Filed: May 13, 1971

[21] Appl. No.: 143,017

[52] U.S. Cl. ................................55/32, 55/171
[51] Int. Cl. ............................................B01d 53/14
[58] Field of Search..............55/32, 33, 31, 171–177

[56] References Cited
UNITED STATES PATENTS

| | | | |
|---|---|---|---|
| 3,318,071 | 5/1967 | Sinex | 55/32 |
| 3,331,188 | 7/1967 | Sinex | 55/31 |
| 3,616,598 | 11/1971 | Foral, Jr. | 55/32 |
| 3,182,434 | 5/1965 | Fryer | 55/32 |
| 3,347,019 | 10/1967 | Barnhart | 55/32 |
| 3,471,370 | 10/1969 | Jubin | 55/32 |

*Primary Examiner*—Charles N. Hart
*Attorney*—Young & Quigg

[57] ABSTRACT

Apparatus and method for drying a gas by passing said gas stream through an absorber where water and some hydrocarbons are removed therefrom, passing the absorbent and removed water and hydrocarbons to a stripping zone, removing the hydrocarbons and water from the absorbent, separating the water and hydrocarbons one from the other and drying and recycling the hydrocarbons to the stripping zone for stripping water from the absorbent flowing therethrough.

10 Claims, 2 Drawing Figures

INVENTORS
C. E. ALLEMAN
W. F. TUCKETT

BY Young & Quigg

ATTORNEYS

APPARATUS AND METHOD FOR DRYING GAS BY GLYCOL SCRUBBING

In heretofore utilized drying apparatus and methods, natural gas was often directed into the process for stripping water from the absorbent in order to provide additional reconcentration of the recycled absorbent. After the stripping by the natural gas, said gas was generally flared or vented to the atmosphere. In order to improve the economics and to alleviate pollution problems, some apparatus and methods have been developed whereby a condensible hydrocarbon stream is utilized to replace the flared natural gas stripping medium. These heretofore utilized hydrocarbon streams were wet hydrocarbon streams that were condensible at cooling water temperatures and were recycled as a wet stream into the stripping zone.

In order to improve the drying efficiency of a gas drying process while avoiding pollution of the environment and waste, apparatus and methods were discovered for separating and drying a hydrocarbon stream discharging from the separating zone and recycling this dried stream to the separating zone. By the method and apparatus of this invention, pollution of the atmosphere is avoided, the reconcentrated absorbent recycled to the absorber has a lower water concentration and thereby the drying efficiency of the absorbent is improved and the waste of valuable products is eliminated.

Other aspects, objects, and advantages of the present invention will become apparent from a study of the disclosure, the appended claims, and the drawing.

The drawings are diagrammatic views of the apparatus of this invention. FIG. 1 shows a gas drying system with the drier and apparatus of this invention installed therein, and FIG. 2 shows another embodiment of apparatus for providing a dried hydrocarbon stream for the stripping zone of the system.

Referring to FIG. 1, a hydrocarbon gas feedstream 2 is passed through an absorber 3 which has an absorbent stream 4 passing therethrough. The absorber 3 preferably has the absorbent entering the upper portion of the absorber 3 and the gas stream 2 entering the lower portion of the absorber 3 for countercurrent, contacting flow of the absorbent and the gas stream 2 therethrough. During flow through the absorber 3, the absorbent separates water and some hydrocarbons from the gas stream 2. The absorbent with associated water and hydrocarbons discharge from the absorber 3 into a stripping column 5 which has a reboiler 7 associated therewith. In the stripping column 5 and reboiler 7, the water and hydrocarbons are separated from the absorbent with said absorbent being recycled back to the absorber 3 through line 4. The water and hydrocarbon discharges from the stripping column through a conduit 9 at the upper portion of the stripping column 5 and flows into a condenser 11 wherein said water and hydrocarbon are condensed and passed into a phase separator 13 at which location the hydrocarbons and water streams are gravitationally separated one from the other by virtue of their immiscibility. Said phase separator is preferably maintained at a pressure of about 1 atmosphere.

A liquid hydrocarbon conduit 6 is connected to the separator and a lower portion 8 of a drier 17 for passing the liquid hydrocarbon stream from the separator 13 to the drier 17. A first conduit 12 is connected to an upper portion 10 of the drier 17 and the reboiler 7 of the stripping column 5. A second conduit 14 is connected to the lower portion 8 of the drier 17 and to an absorbent stream 19 passing from the absorber 3 to the stripping column 5. The hydrocarbon stream discharging from the separator 13 therefore passes countercurrently through the drier 17 in contact with and relative to an absorbent passing from the absorbent stream 4' to and through the drier 17 via line 14. The hydrocarbon stream is thereby dried and recycled to the stripper 5 through line 12 for separating water from the absorbent and the absorbent having separated water therein is recycled to the stripper 5 via line 19 for reconcentration.

Figure 2:
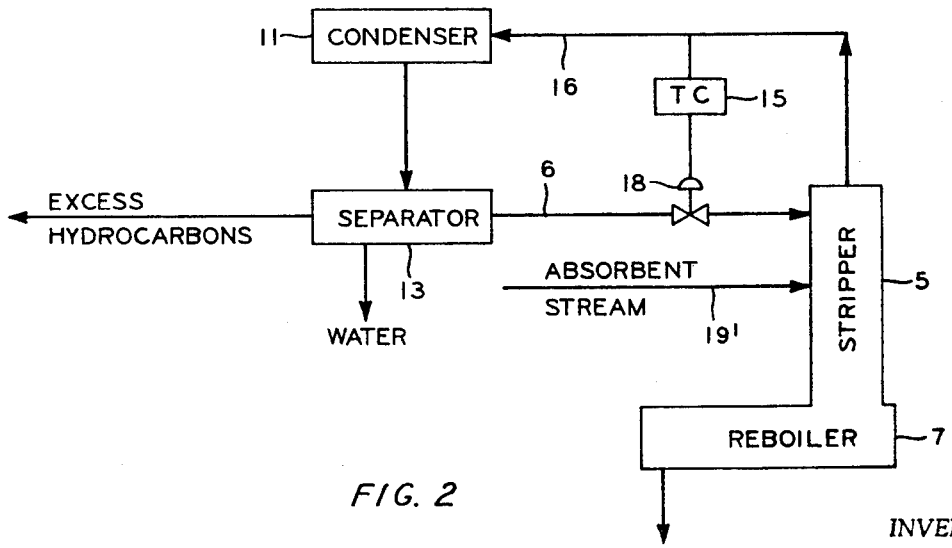

FIG. 2 shows another embodiment for drying the separated hydrocarbon stream by utilizing the hot gases passing upwardly through the stripper 5. In this embodiment, the liquid hydrocarbon conduit 6 is connected to the separator 13 and to the upper potion of the stripping column 5 at a location spaced a preselected distance from the associated reboiler 7. In this embodiment, the liquid hydrocarbon stream is utilized as the only reflux for the stripping column 5. The location of the connection of the liquid hydrocarbon conduit on the stripping column 5 should be a distance spaced from the reboiler 7 sufficient for heating the liquid hydrocarbon discharged from the liquid hydrocarbon conduit 6 to about the preselected temperature of the reboiler 7 during passage of the liquid hydrocarbon from the liquid hydrocarbon conduit 6 to the reboiler 7. This distance can be easily calculated by one skilled in the art after the flow rates of the fluid streams into and through the stripping column 5, heat input, and size of the stripping column 5 are known.

A temperature measuring means 15, such as Taylor Instrument Co. Model 422 temperature controller, for example, is preferably associated with the conduit 16 connecting the upper potion of the stripping column 5 to the condenser 11 for measuring the temperature of the fluid passing therethrough and delivering a signal representative of that temperature. A controlling valve 18 such as, for example, Fisher Controls Company Model 125-P with Micro Form trim, is positioned in the liquid hydrocarbon conduit 6 and connected to the temperature measuring means 15 for receiving the signal from said means 15 and controlling the flow of liquid hydrocarbon reflux through the liquid hydrocarbon conduit 6 in response to said received signal and thereby maintaining the operation of the stripping column at more uniform operating conditions which improves efficiency and reduces waste. It is also preferred that the absorbent stream flowing from the stripping column 5 into the absorber 3 (FIG. 1) be cooled prior to entering said absorber 3 by passing said absorbent stream through a heat exchanger 20, for example, and thereafter into the absorber 3. The heat exchanger can be, for example, a Brown Fintube Co. single finned tube countercurrent exchanger. The wet absorbent stream 19' passing from the absorber 3 into the stripping column 5 should enter the stripping column 5 at a distance spaced from the reboiler 7 such that during flow of the absorbent through the stripping zone it will be heated and increased in temperature to a value at the elevation of the reboiler 7 of about the preselected temperature of the reboiler 7.

In the method of this invention, the hydrocarbon feedstream flows preferably countercurrently through the absorber 3 relative to an absorbent stream passing therethrough with the feedstream being in contact with the absorbent. During this contact within the absorber 3, the absorbent, which is preferably a glycol for example, absorbs water and some hydrocarbons from the gas stream thereby drying the gas. The absorbent stream passes through the absorption zone, into and through a stripping zone and is recycled to the absorption zone.

In the stripping zone, the hydrocarbon and water in the glycol is stripped therefrom and passed through a condensing zone and a separating zone where the water and hydrocarbons are liquefied, separated, and separately discharged therefrom.

The gas to be dried can be, for example, a gas having the constituents as follows:

| Constituent | Vol. % |
|---|---|
| $CO_2$ | 0.6 |
| $N_2$ | 2.4 |
| $C_1$ | 68.4 |
| $C_2$ | 13.8 |
| $C_3$ | 10.6 |
| $C_4$ | 3.2 |
| $C_5$ | 0.8 |
| $C_6+$ | 1.4 |
| Saturated with water | |
| Sp. Gr. 60/60=0.8 | |

The hydrocarbons added through line 19 to the stripper 5 can be, for example, a hydrocarbon or hydrocarbon mix of aromatics having a molecular weight from about 90 to about 120.

In the embodiment shown in FIG. 1, a dry absorbent stream recycling from the stripping zone is passed via line 6 into and through a drying zone 17 and into the absorbent stream passing from the absorbent zone to the stripping zone via line 19. The separated liquid hydrocarbon stream is passed through the drying zone 17 in a direction opposed to the direction of flow of the absorbent passing therethrough and in contact with said absorbent for removing water from said hydrocarbon stream. The hydrocarbon stream discharging from the drying zone is recycled to the stripping zone via line 12 for stripping water from the absorbent flowing therethrough.

By passing the streams countercurrently through the drier, the hydrocarbon stream becomes progressively more dry and in such condition encounters absorbent that is progressively more dry. By this means, the hydrocarbon stream discharging from the drier has a very low water concentration and therefore functions with improved efficiency within the stripping zone. The dry absorbent entering the drying zone can be cooled prior to entering said drying zone which will further increase the efficiency of the drying zone and provide a resultant liquid hydrocarbon stream that has an even lower water concentration. It is recommended that, when the absorbent stream is triethylene glycol, this stream be cooled to a temperature in the range of about 50°F to 150°F. If other absorbents are used the temperature will vary accordingly. At lower temperatures than about 50°F this glycol becomes too viscous for efficient contacting functions, and at higher temperatures than about 150°F, the drying potential of the glycol becomes unduly low for the extra reconcentration desired. It is preferred, however, that the water concentration of the liquid hydrocarbon stream be lowered in the drying zone to a value at least below about 0.1 wt. percent.

As shown in FIG. 2, at least a portion of the separated hydrocarbon stream is passed from the separator via line 6 into and downwardly through the stripping zone 5. As the liquid hydrocarbon stream passes through the stripping zone 5 in a direction toward the reboiler 7 of the stripping zone 5, the temperature of the hydrocarbon stream is progressively increased and water is stripped therefrom by the rising vapors within the stripping column. By the time the hydrocarbon stream reaches the elevation of the reboiler 7, the stream is exceptionally dry and is at about the preselected temperature of the reboiler 7.

In the reboiler zone 7, the hydrocarbon stream is vaporized. The hydrocarbon stream in the dry, vaporized condition passes upwardly through the reboiling zone countercurrently to and in contact with the absorbent stream thereby stripping the water from the absorbent. The hydrocarbon stream and stripped water continue to pass upwardly through the stripping zone 5 and are recycled therefrom to the condenser 11.

It is important that the hydrocarbon stream passing through line 6 is here utilized as the only reflux for the stripping zone and the absorbent stream passing through line 19 be discharged into the stripping zone 5 at a location such that, at the flow rates of the fluids passing through the stripping zone 5 and the heat delivered thereinto, the time required for units of the hydrocarbon stream and the absorbent to travel to the elevation of the reboiler 7 is such that upon arrival at the reboiler 7, said units are at a temperature about equal to the preselected temperature of the reboiling zone, for example about 350°F to 405°F in the case of triethylene glycol absorbent. By so countercurrently contacting the descending liquid hydrocarbon with dry, hot vapors, the hydrocarbon stream entering the reboiler 7 is in an extremely dry condition. Upon vaporization, the dry hydrocarbon vapors flowing countercurrently relative to the absorbent more efficiently strips the water from the absorbent.

The following is an example of the operating conditions of the process on the feed stream set forth above:

EXAMPLE I

| Location (Ref. to FIG. 1) | Temp. (°F) | Pressure (psi) | Flow Rate |
|---|---|---|---|
| 2 | 78 | 520 | 35 mm scfd |
| 3 | | 520 | |
| 4 | 178 | | 5½ gpm |
| 4' | | | ½ gpm |
| 4'' | 78 | | 5 gpm |
| 6 | | | ½ gpm |
| 9 | | | 48 cfm |
| 12 | | | ½ gpm |
| 13 | | 1 atmos. | |
| 19 | 230 | | 5 ½ gpm |
| 19' | 78 | | |
| Reboiler Heat | 375-450 | | |

| Location | Composition | |
|---|---|---|
| 2 | $CO_2$ | 0.6 (vol %) |
| | $N_2$ | 2.4 |
| | $C_1$ | 68.4 |
| | $C_2$ | 13.8 |
| | $C_3$ | 10.6 |
| | $C_4$ | 3.2 |
| | $C_5$ | 0.8 |
| | $C_6+$ | 1.4 |
| 4 | 99.9% TEG | |
| 6 | HC + 6% water | |
| 9 | 36 cfm water + 12 cfm HC | |
| 19 | 97.8% TEG | |

This example shows the exceptional dryness of the glycol that can be achieved by the method and apparatus of this invention.

The method and apparatus of this invention separates the hydrocarbon stream from the absorbent during reconcentration thereof and thereafter recycles this stream for drying of the glycol, thereby avoiding waste over heretofore utilized methods and apparatus which flared the natural gas used for stripping and the hydrocarbon stream. The efficiency of the system is also increased over heretofore utilized methods owing to the fact that the hydrocarbon stream is utilized for stripping and that stream is dried by methods of the invention prior to being provided for water stripping functions.

Other modifications and alterations of this invention will become apparent to those skilled in the art from the foregoing discussion and accompanying drawing and it should be understood that this invention is not to be unduly limited thereto.

What is claimed is:

1. In a process for drying a hydrocarbon gas stream by passing said gas stream through an absorption zone, said absorption zone having an absorbent stream passing through the absorption zone, into a stripping zone, and being recycled to the absorption zone with hydrocarbons and water removed from the hydrocarbon gas stream by the absorbent stream and thereafter being separated from the absorbent stream in the stripping zone and being passed through a condensing zone and a separating zone for liquefying and separating the water and liquid hydrocarbons one from the other and separately passing the water and liquid hydrocarbon streams from the separating zone, the improvement comprising:
   passing a dry absorbent stream from the stripping zone into a drying zone, through the drying zone, and into the absorbent stream passing from the absorption zone to the stripping zone while passing the separated liquid hydrocarbon stream to and countercurrently through the drying zone relative to and in contact with the absorbent stream flowing therethrough and recycling said liquid hydrocarbon stream into the stripping zone for stripping water from said absorbent flowing therethrough.

2. A method, as set forth in claim 1, including cooling the dry absorbent stream prior to injecting said stream into the drying zone.

3. A method, as set forth in claim 2, wherein the absorbent is triethylene glycol and including cooling the dry absorbent passing into the drying zone to a temperature in the range of about 50° to 150°F.

4. A method, as set forth in claim 1, including lowering the water concentration of the liquid hydrocarbon stream in the drying zone to a value at least below about 0.1 wt. percent.

5. A method, as set forth in claim 1, wherein the absorbent is a glycol.

6. In a process for drying a hydrocarbon gas stream by passing said gas stream through an absorption zone, said absorption zone having an absorbent stream passing through the absorption zone, into a stripping zone, and being recycled to the absorption zone with hydrocarbons and water removed from the hydrocarbon gas stream by the absorbent stream and thereafter being separated from the absorbent stream in the stripping zone and being passed through a condensing zone and a separating zone for liquefying and separating the water and liquid hydrocarbons one from the other and separately passing the water and liquid hydrocarbon streams from the zeparating zone, the improvement comprising:
   passing at least a portion of the separated liquid hydrocarbon stream from the separator to and downwardly through the stripping zone in contact with the absorbent passing therethrough for drying the liquid hydrocarbon stream;
   vaporizing the hydrocarbon stream within a reboiling zone of the stripping zone;
   passing the vaporized hydrocarbon stream countercurrently through the stripping zone relative to and in contact with the absorbent passing therethrough for stripping water from the absorbent; and
   recycling the vaporized hydrocarbon and water streams to the condenser.

7. A method, as set forth in claim 6, including passing the liquid hydrocarbon and absorbent streams downwardly through the stripping zone for a time sufficient for increasing the temperature of said streams to a temperature at the elevation of the reboiling zone of the stripping zone of about a preselected temperature of the reboiling zone.

8. A method, as set forth in claim 6, wherein the temperature of the downwardly passing hydrocarbon stream at the elevation of the reboiling zone of the stripping zone is in the range of about 350° to about 405°F.

9. A method, as set forth in claim 6, wherein the absorbent is a glycol.

10. In an apparatus for drying a hydrocarbon gas stream by passing said gas stream upwardly through an absorber, said absorber having an absorbent stream passing downwardly therethrough in contact with the gas stream, discharging into a stripping column having a reboiler, and being recycled back to the upper portion of the absorber, a conduit connected to an upper portion of the stripping column and a condenser for passing hydrocarbons and water from the stripping column and into the condenser, and a separator connected to the condenser, the improvement comprising:
   a liquid hydrocarbon conduit connected to the separator for passing a liquid hydrocarbon stream therefrom;
   a drier having upper and lower portions and being connected to the absorbent stream between the reboiler and the upper portion of the absorber for passing absorbent thereinto and being connected at the lower portion to the liquid hydrocarbon conduit for passing liquid hydrocarbons thereinto;
   a first conduit connected to the upper portion of the drier and the reboiler of the stripping column for passing a dried liquid hydrocarbon stream from the upper portion of the drier into the reboiler; and
   a second conduit connected to the lower portion of the drier and the absorbent stream passing from the absorber to the stripping column for passing absorbent from the drier to the stripping column.

* * * * *

UNITED STATES PATENT OFFICE

CERTIFICATE OF CORRECTION

Patent No. 3,736,725        Carl E. Alleman; and      Dated: June 5, 1973
                            William F. Tuckett It is certified that error appears in the above-identified patent and that said Letters Patent are hereby corrected as shown below:

Column 6, line 3, "zeparating" should read -- separating --.

Signed and sealed this 19th day of March 1974.

(SEAL)
Attest:

EDWARD M.FLETCHER,JR.                C. MARSHALL DANN
Attesting Officer                    Commissioner of Patents